E. EISEMANN.
STORAGE BATTERY CHARGING SWITCH FOR AUTOMOBILES.
APPLICATION FILED NOV. 9, 1911.
1,125,080.
Patented Jan. 19, 1915.
2 SHEETS—SHEET 1.
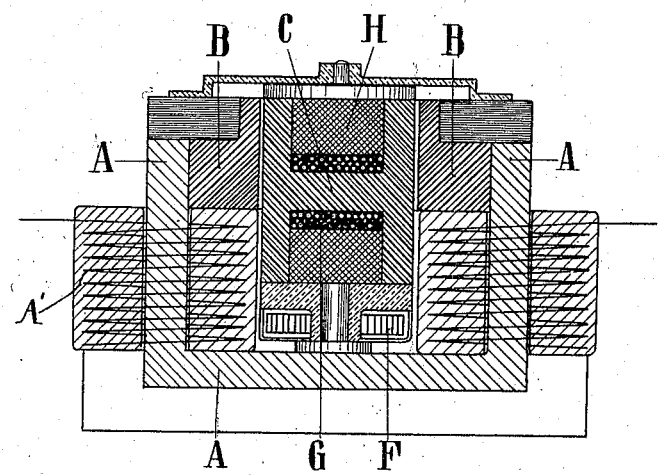
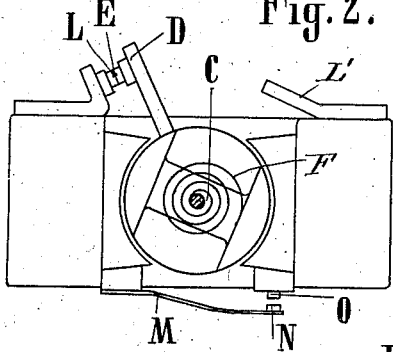
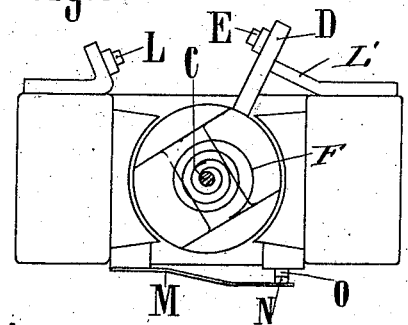
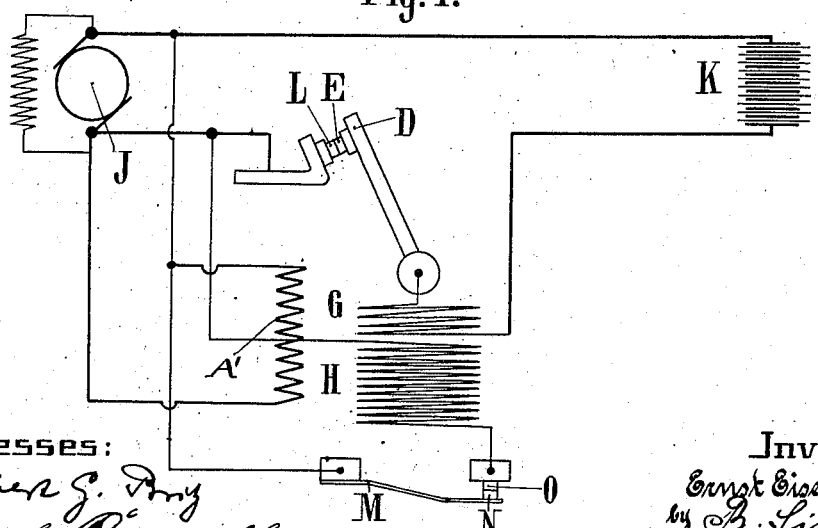
Witnesses:
Inventor E. EISEMANN.
STORAGE BATTERY CHARGING SWITCH FOR AUTOMOBILES.
APPLICATION FILED NOV. 9, 1911.

1,125,080.

Patented Jan. 19, 1915.
2 SHEETS—SHEET 2.

Witnesses:

Inventor:
Ernst Eisemann
by B. Singer
Attorney.

United States Patent Office.

ERNST EISEMANN, OF STUTTGART, GERMANY.

STORAGE-BATTERY-CHARGING SWITCH FOR AUTOMOBILES.

1,125,080.  Specification of Letters Patent.  Patented Jan. 19, 1915.

Application filed November 9, 1911. Serial No. 659,408.

*To all whom it may concern:*

Be it known that I, ERNST EISEMANN, a subject of the German Emperor, and residing at Stuttgart, Germany, have invented certain new and useful Improvements in Storage-Battery-Charging Switches for Automobiles, of which the following is a specification.

The subject-matter of this invention is a storage battery charging switch which not only automatically cuts the charging machine into and out of circuit when the charging voltage exceeds or does not reach a predetermined amount, but also automatically disconnects the charging machine as soon as the accumulator battery has reached its maximum voltage.

My improved switch substantially consists of armatures which can oscillate in polarized fields, control contacts and, when the voltage of the charging dynamo is equal to the normal charging voltage, are set in the polar axes and thereby close the said contacts, whereas when the normal charging voltage is not attained, the armatures are placed by springs transversely of the field and thereby open the said contacts, and when the maximum charging voltage of the battery is exceeded, the armatures are likewise placed transversely of the field and permanently break the circuit.

Two illustrative embodiments of the invention are represented by way of example in the accompanying drawings, wherein:—

Figure 5:
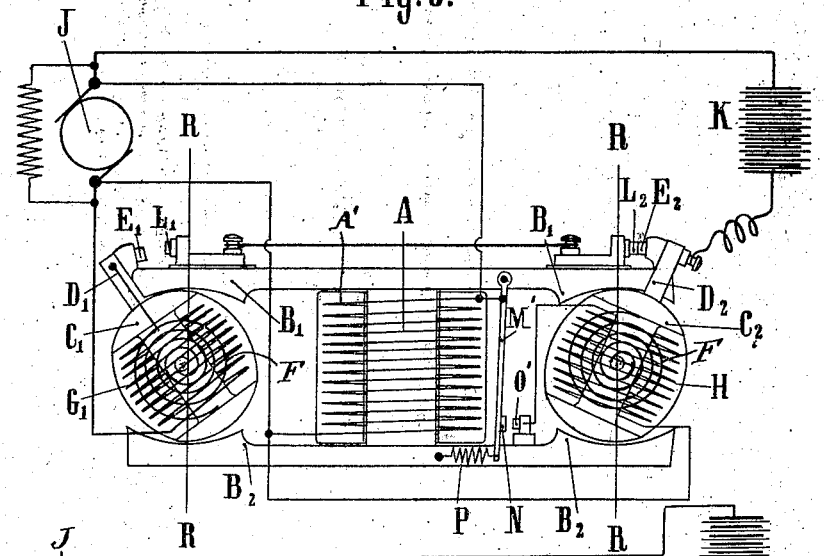
Figure 6:
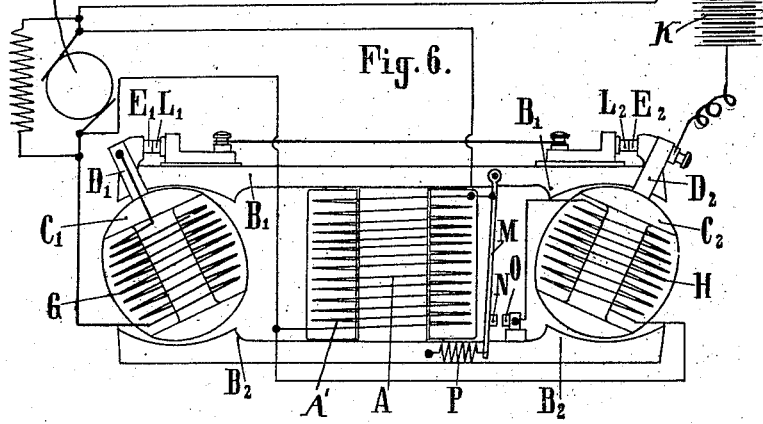
Figure 7:
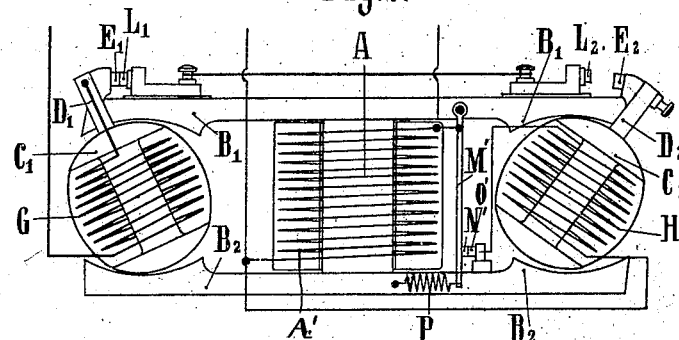

Figure 1 is a vertical longitudinal section showing one form; Figs. 2 and 3 are top plan views showing the same in two different positions of the armature; Fig. 4 is a diagram of connections, and Figs. 5 to 7 show the second form of switch diagrammatically.

Referring firstly to Figs. 1 to 4, A designates an electromagnet having a winding A' and which is designed so that the magnetic induction is on the rapidly rising branch of the magnetization curve, so that small changes of voltage and, with it, of the strength of current in winding A' bring about relatively large changes in the lines of force in the winding of this magnet. Two pole pieces B conduct the lines of force through the rotatable armature C. An arm D carrying a platinum contact E is rigidly connected with the armature. The armature is under the influence of a spring F which tends to place it transversely of the field in such manner that, as shown in Fig. 3, the contact E of the arm D is separated from the contact L and the arm D bears against a fixed stop L'. The armature carries two windings, one winding G of few turns of thick wire capable of being connected in series with the charging dynamo J, through contacts L and E and one winding H of many turns of thin wire capable of being connected in shunt with the charging machine by relay contacts N and O. The winding G normally aids the action of the field of the electromagnet A in such manner that the armature endeavors to set itself in the polar axis, whereas the winding H reduces the action of the polar field as soon as it is traversed by current, so that the armature tends to follow the action of its spring F.

A relay M having the two platinum contacts N and O is connected in magnetic shunt with the electromagnet A. This relay M comprises an arm formed of magnetic material and when the armature C lies in the polar axis of the magnet A there is ordinarily no straight field of sufficient force to actuate the relay M so as to bring the contact N and O together. When, however, the current flowing through the winding A' increases owing to the increased voltage of the battery K or the generator J a sufficient number of lines of force will pass from one pole of the magnet to the other through the air to cause the arm of the relay M to be attracted by the magnet at its free end thus closing the contacts N and O as shown in Fig. 3. The relay M is so regulated that it remains open until the maximum charging voltage of the battery obtains, but then closes owing to the increasing magnetic force of the electromagnet A and thereby connects the winding H into circuit.

The operation of the switch is as follows:—The magnetic relay being opened, when the charging dynamo J starts and has reached the terminal voltage requisite for charging, the winding A' excites the electromagnet A sufficiently to drive the armature C against the action of its spring F from its rest position (Fig. 3) into the circuit-closing position (Fig. 2), whereupon the platinum contact E bears against the contact L and closes the circuit. The battery K and the series winding G are now connected in circuit as appears clearly from Fig. 4. As the winding G aids the action of the magnet A, while the terminal voltage of the machine J increases, the pressure between the contacts E and L increases; if, on the contrary, the terminal voltage falls below that of the battery so that a current flows back from the battery to the dynamo, the winding G weakens the field of the electromagnet A to such an extent that the action of the spring F preponderates and the armature C is turned, i. e. the contacts E and L are parted. The armature closes the circuit again as soon as the voltage of the charging dynamo has again exceeded that of the battery by the requisite amount. When the battery K has reached its maximum voltage, however, the correspondingly regulated relay M is operated in such manner that the contacts N and O contact one another, and the winding H which reduces the field of the electromagnet A is thrown into circuit. The armature C then rotates under the action of its spring into the rest position, thereby interrupting the circuit at contacts L and E. As soon as this interruption of the main circuit has taken place the terminal voltage of the charging dynamo rises to its maximum value and the field of the magnet A due to the winding A' tends to increase correspondingly. But as the current traversing the shunt winding H increases correspondingly and simultaneously opposes the passage of the magnetic lines through the armature C and the field, the armature C remains in its rest position under the action of the spring F.

The illustrative embodiment according to Figs. 5 to 7 differs from that just described in that, instead of one oscillating armature carrying a contact, two armatures each carrying a contact are provided.

In Fig. 5 the letter J again designates the charging dynamo, K the battery to be charged, A an electromagnet whose winding A' is permanently connected to the terminals of the charging dynamo, and which is so designed that the magnetic induction is located on the rapidly rising branch of the curve of magnetization, so that small changes of the voltage and, with it, of the current in winding A' produce considerable changes in the lines of force. In contradistinction to the former form, the magnetic field has four poles, so that there are two pairs of like poles $B^1$, $B^1$ and $B^2$, $B^2$. Between each pair of opposite poles $B^1$, $B^2$ is journaled an armature $C^1$ and $C^2$, respectively; these carry small levers $D^1$, $D^2$ having contact pieces $E^1$, $E^2$ which can bear against fixed contacts $L^1$, $L^2$ mounted on the frame. These armatures $C^1$, $C^2$, are held by spring pressure in the positions shown in Fig. 5, i. e. the armature $C^1$ transversely of the field so that the contact $E^1$, $L^1$ is broken, the armature $C^2$ in the axis of the field so that the contacts $E^2$, $L^2$ contact one another. The armature $C^1$ carries a winding connected in series with the dynamo J and the armature $C^2$ a winding H connected in shunt with the same.

The mode of operation of the switch is as follows:—If the terminal voltage of the machine J rises to the amount requisite for the charging of the battery, the terminal voltage being in excess of the battery voltage, the strength of the field of the electromagnet increases to such an extent that the armature tends to place itself in the axis of the field R, R and the contact $E^1$, $L^1$ is closed. Current then flows from the dynamo through the winding $G^1$ and the contacts $E^1$, $L^1$; $E^2$, $L^2$, to the battery K. The holding together of the contact $E^1$, $L^1$ is aided by the action of the winding $G^1$ strengthening the field as long as current flows from the dynamo J to the battery K. If the terminal voltage of the dynamo J sinks so that current flows back from the battery K to the dynamo, the winding $G^1$ reduces the field of the electromagnet so that the action of the spring on the armature $C^1$ preponderates and the contact $E^1$, $L^1$ is opened. When the terminal voltage of the dynamo increases again, the circuit is closed afresh, which operations are repeated according to the relation of the voltages of the battery and the charging dynamo. When, on the other hand, the battery K attains its maximum charging voltage, the shunt winding H of the armature $C^2$ is connected to the dynamo J by means of a relay M' which is connected in magnetic shunt with the electromagnet A and has a contact N' adapted to bear against a fixed contact O' on the frame. When this relay acts the armature $C^2$ is placed by the electromagnetic action of the shunt winding H, transversely of the field and the contacts $E^2$, $L^2$ are opened, whereby the dynamo is disconnected from the battery K. The spring P of the relay is so designed that the relay M' is closed only as soon as the battery has attained its maximum charging voltage. The contacts $L^2$, $E^2$ then remain open, because, on the one hand, when the terminal voltage of the dynamo increases the field of the magnet A increases, but on the other hand the electromagnetic action of the winding H likewise increases a certain amount. If, on the contrary, the dynamo J is stopped, the relay M' opens, the contact $E^1$, $L^1$ also opens, while the contact $L^2$, $E^2$ closes, so that the original condition according to Fig. 5 again obtains.

I claim:—

1. In a plant for charging accumulators, the combination, with a dynamo, an electromagnet having a winding connected in shunt therewith, and a storage battery having one pole connected to one terminal of the dynamo, of a fixed contact piece connected to the other terminal of the dynamo, an armature arranged to oscillate between the poles of the said magnet and carrying a movable contact piece adapted to contact with the former contact piece when the armature is located in the polar axis of the magnet, said armature having a series winding having one end connected to the movable contact piece and the other end connected to the other pole of the battery, and a spring tending to rotate the armature out of the polar axis of the magnet and to remove the movable contact from the fixed contact; a relay arranged in magnetic shunt with the said magnet, said armature carrying a shunt winding differential to the winding of said electromagnet, and connected to the said fixed contact piece and to one contact piece of said relay, the other contact piece of the relay being connected to the former terminal of the dynamo.

2. The combination of a storage battery, a source of current for charging the same, and a controlling switch, said switch comprising an electro-magnet having its winding in parallel with the said source and battery, an armature attracted by the electro-magnet, means for yieldingly opposing such attraction, a series winding on the armature, means controlled by the armature for connecting the series winding in circuit with the said source and battery when the armature is attracted by the electro-magnet, said series winding being energized by current flowing from the said source to the battery to assist the electro-magnet in holding the armature in attracted position, and energized to oppose the electro-magnet by a reverse flow of current whereby the series winding will be open-circuited by the movement of the armature, a shunt winding on the armature arranged in shunt relation to the said source of current, and means operated by the electro-magnet when the battery has reached maximum voltage for connecting the shunt winding in circuit to cause the series winding to be open-circuited and the charging to be interrupted.

3. The combination of a battery, a source of current connected therewith, and a circuit-controlling device comprising an electro-magnet having a winding in parallel with the said source, a series winding adapted to be connected in circuit with the said source and battery by the energizing of the electro-magnet at charging voltage of the said source and to be automatically open-circuited when the said source falls in voltage below the battery, a shunt winding, and means actuated by the electro-magnet upon the maximum voltage of the charging current for connecting the said shunt across the terminals of the said source whereby the said series winding is open-circuited and the charging of the battery interrupted.

4. The combination of a source of current, a battery charged therefrom, and a circuit-controlling device, said device comprising an electro-magnet having its windings connected across the circuit, an armature operated by the electro-magnet, means for opposing the attraction of the electro-magnet on the armature, a fixed contact connected with one terminal of the said source, a movable contact connected with the armature, a series winding on the armature connected with the movable contact and one terminal of the battery and operating to oppose the attraction of the electro-magnet on the armature when current flows from the battery to the said source and thereby permits the contacts to separate, a shunt winding mounted on the armature, and a device controlled by the magnetic attraction of the electro-magnet when the voltage of the circuit is maximum for closing the circuit through the shunt winding whereby the latter opposes the magnetism of the electro-magnet and permits the said contacts to separate.

5. A battery charging controlling switch comprising an electro-magnet, an armature movably mounted with respect to the poles thereof, spring means connected with the armature for holding it in a given position, a contact carried by the armature, a fixed contact on the electro-magnet to be engaged by the armature contact when the armature is attracted, a winding on the armature and connected in circuit by the said contacts whereby the flow of current in one direction through the winding coöperates with the electro-magnet for holding the said armature in attracted position, and the flow of current in the opposite direction causes magnetic opposition to the electro-magnet to permit the said spring means to move the armature and separate the said contacts, another winding on the armature adapted when energized to oppose the attraction of the electro-magnet on the armature, and means operated by the electro-magnet when its attraction is maximum for connecting the last-mentioned winding of the armature in circuit.

In testimony whereof, I affix my signature in the presence of two witnesses.

ERNST EISEMANN.

Witnesses:
ERNEST ENTERMANN,
FRIDA KLAIBER.